(12) United States Patent
Garcia et al.

(10) Patent No.: US 10,173,531 B2
(45) Date of Patent: Jan. 8, 2019

(54) CARRYING DEVICE AND A RECEIVING DEVICE

(71) Applicant: Bombardier Primove GmbH, Mannheim (DE)

(72) Inventors: Federico Garcia, Mannheim (DE); Anton Geiger, Mannheim (DE); Tobias Leininger, Mannheim (DE); Nestor Martinez Pelaez, Mannheim (DE)

(73) Assignee: Bombardier Primove GmbH, Mannheim (DE)

(*) Notice: Subject to any disclaimer, the term of this patent is extended or adjusted under 35 U.S.C. 154(b) by 169 days.

(21) Appl. No.: 14/908,803

(22) PCT Filed: Jul. 29, 2014

(86) PCT No.: PCT/EP2014/066257
§ 371 (c)(1),
(2) Date: Jan. 29, 2016

(87) PCT Pub. No.: WO2015/014827
PCT Pub. Date: Feb. 5, 2015

(65) Prior Publication Data
US 2016/0185226 A1    Jun. 30, 2016

(30) Foreign Application Priority Data

Aug. 1, 2013  (GB) .................................. 1313785.6

(51) Int. Cl.
*B60L 5/00* (2006.01)
*B60L 11/18* (2006.01)
*F16M 13/02* (2006.01)

(52) U.S. Cl.
CPC ............ *B60L 5/005* (2013.01); *B60L 11/182* (2013.01); *F16M 13/02* (2013.01);
(Continued)

(58) Field of Classification Search
CPC .... B60L 5/00; B60L 5/005; B60L 5/40; B60L 5/42; B60L 13/00; B60L 13/03; B60L 13/035; B60L 13/04; B60L 13/10
See application file for complete search history.

(56) References Cited

U.S. PATENT DOCUMENTS

2008/0129246 A1   6/2008  Morita et al.
2010/0097168 A1*  4/2010  Hahn ...................... B60L 13/03
                                                                 336/96
(Continued)

FOREIGN PATENT DOCUMENTS

CN       101511630 A       8/2009
DE    102006048831 A1      4/2008
(Continued)

*Primary Examiner* — Robert J McCarry, Jr.
(74) *Attorney, Agent, or Firm* — The Webb Law Firm

(57) ABSTRACT

Provided herein is a carrying device of a receiving device of a system for inductive power transfer to a vehicle, including: a carrying plate, a first edge element arranged at a first lateral edge of the carrying plate, and at least another edge element arranged at a second lateral edge of the carrying plate. The edge elements are slanted with respect to the carrying plate. The carrying plate and the edge elements are made of non-magnetic material. Also provided herein is a method of manufacturing the carrying device of the receiving device.

21 Claims, 5 Drawing Sheets

(52) U.S. Cl.
CPC ........ *Y02T 10/7005* (2013.01); *Y02T 10/7072* (2013.01); *Y02T 90/122* (2013.01); *Y02T 90/14* (2013.01)

(56) References Cited

U.S. PATENT DOCUMENTS

| | | |
|---|---|---|
| 2013/0181797 A1 | 7/2013 | Hickox |
| 2014/0320078 A1 | 10/2014 | Nakamura et al. |
| 2015/0102664 A1 | 4/2015 | Tatsuta et al. |

FOREIGN PATENT DOCUMENTS

| | | |
|---|---|---|
| GB | 2497822 A | 6/2013 |
| GB | 2501482 A | 10/2013 |
| GB | 2502084 A | 11/2013 |
| GB | 2505227 A | 2/2014 |
| GB | 2507741 A | 5/2014 |
| JP | 2012151311 A | 8/2012 |
| JP | 2012257445 A | 12/2012 |
| JP | 201390392 A | 5/2013 |
| WO | 2010038326 A1 | 4/2010 |
| WO | 2013076804 A1 | 5/2013 |
| WO | 2013125372 A1 | 8/2013 |
| WO | 2013145579 A1 | 10/2013 |

* cited by examiner

CARRYING DEVICE AND A RECEIVING DEVICE

CROSS-REFERENCE TO RELATED APPLICATIONS

This application is the United States national phase of International Application No. PCT/EP2014/066257 filed Jul. 29, 2014, and claims priority to United Kingdom Patent Application No. 1313785.6 filed Aug. 1, 2013, the disclosures of which are hereby incorporated in their entirety by reference.

BACKGROUND OF THE INVENTION

Field of the Invention

The invention relates to a carrying device and a receiving device, in particular a carrying device of a receiving device of a system for inductive power transferred to a vehicle. Further, the invention relates to a method of manufacturing a carrying device and a receiving device.

In particular, the invention relates to a carrying device and a receiving device to be mounted on an electric vehicle which shall be operated with electric energy produced by magnetic induction.

Description of Related Art

While travelling on a route, a vehicle requires energy for driving (i.e. propulsion) and for auxiliary equipment which does not produce propulsion of the vehicle. Such auxiliary equipment includes, for example, lighting systems, heating and/or air conditioning systems, ventilation and passenger information systems. Not only track-bound vehicles (such as trams), but also road automobiles can be operated using electric energy. Vehicles, in particular electric vehicles, may be provided with energy in different manners. One option is to charge an energy storage on-board the vehicle while the vehicle stops and by using an electric cable connection. According to another option, the energy is transferred to the vehicle in a wireless manner using a magnetic field which induces an electric voltage in at least one inductance on-board the vehicle. The expression receiving device or pick-up has been used for the device which comprises at least one conductance. The document GB 1215053.8 discloses such an inductive pick-up arrangement to be mounted on an electric vehicle which shall be operated with electric energy produced by the arrangement by magnetic induction. The arrangement comprises a pick-up portion comprising at least on electric inductance for receiving a magnetic field and for producing the electric energy. Further, the arrangement comprises a mounting portion to be mounted on the vehicle.

The transfer of electric energy to the vehicle by induction forms a background of the invention. A route-sided conductor arrangement (primary side) produces an electromagnetic field. The field is received by a vehicle-sided conductor arrangement (secondary side), e.g. a winding structure or coil, on-board of the vehicle so that the field produces an electric voltage by induction. The transferred energy may be used for propulsion of the vehicle and/or for other purposes such as providing the auxiliary equipment of the vehicle with energy. The vehicle may be, for example, a vehicle having an electrically operated drive motor. However, the vehicle may also be a vehicle having a hybrid drive system, e.g. a system which can be operated by electric energy or by other energy, such as energy provided using fuel (e.g. natural gas, diesel fuel, petrol or hydrogen).

The document GB 1220050.7 discloses a cable bearing element of a receiving device, adapted to position and/or to hold at least one line section of an electric line, wherein the cable bearing element provides at least one guiding channel for the section of the electric line.

The document GB 1208508.0 discloses an arrangement for providing vehicles with energy by magnetic induction, wherein the arrangement comprises a primary side electric conductor arrangement adapted to generate an electromagnetic field while an alternating electric current flows through the conductor arrangement and a field shaping layer comprising magnetizable material adapted to shape magnetic field lines of the electromagnetic field. The document also discloses that the field shaping layer comprises a plurality of elements made of the magnetizable material, wherein neighboring elements are positioned at a distance to each other. The elements can be in the shape of tiles. Also, the elements can be fixed to a continuous supporting layer which is made of an electrically conducting material.

The document GB 1207143.7 discloses an arrangement for providing a land vehicle with electric energy by producing an electromagnetic field on a primary side located on the track of the vehicle and/or located at a stop of the vehicle by receiving the electromagnetic field on a secondary side on-board the vehicle above the source of the electromagnetic field and by magnetic induction on the secondary side, wherein the arrangement comprises a secondary side conductor assembly made of electrically conducting material which produces and an electromagnetic stray field during operation while the electrically conducting material carries an alternating electric current. Further, the document discloses a secondary side fielding assembly made of magnetizable material wherein the secondary side shielding assembly or a part of the secondary side shielding assembly extends sideways of the secondary side conductor assembly on the same level as the secondary side conductor assembly, thereby shielding regions, which are located beyond the magnetizable material from the electromagnetic stray field.

US 2008/0129246 A1 discloses a non-contact type power feeder system comprising a power feeding portion provided along a track way for a mobile object, and a power receiving portion provided in the mobile object. The power feeding portion is being opposed face-to-face to the power receiving portion so as to feed a power thereto. The document further discloses an aluminum base board attached to a lower part of a mobile object by means of non-magnetic SUS balls inserted through bolt holes. Further disclosed is a protecting cover which is, for example, made of polycarbonate and which defines therein an internal accommodation space. The protecting cover is attached to the base board by non-magnetic balls inserted through bolt holes. Within the internal accommodation space of the protecting cover, an insulation panel is attached onto the base board. Within the internal accommodation space of the protecting cover, a planar core constituting the power receiving portion is composed of several planar blocks which are superposed one upon another and which are laid horizontally, being joined to one another by an adhesive. Windings are accommodated in a recess in the planar core. A weight of the planar blocks and the windings is carried by the protecting cover as the planar core is firmly joint to the rear surface of the protecting cover.

During an operation of such a vehicle, the receiving device is exposed to certain acceleration forces and vibrations. It is an essential condition for a stable and robust operation of the receiving device that a desired mechanical stability of the components of the receiving device is provided. In other words, components of the receiving device have to be arranged such that under operational conditions none or only minimal movement of the components is allowed. This is due to the fact that the magnetic system, which depends on the relative position of its components, is very sensible towards mechanical changes of said components.

A disadvantage of the design proposed in US 2008/0129246 A1 is that if all or some of the components of the receiving device are placed on the protecting cover, said cover has to provide a high mechanical stability. This, in turn, mostly requires a large building space for said protecting cover. This furthermore reduces the available space between e.g. a bottom side of the vehicle and the ground which is unwanted as such a reduction may lead to mechanical collisions of objects on the ground with the receiving device.

SUMMARY OF THE INVENTION

It is an object of the present invention to provide a carrying device, in particular a carrying device for carrying components of a receiving device of a system for inductive power transfer to a vehicle, which provides a high mechanical stability for the components attached to the carrying device while also optimizing a force transmission of forces acting on the receiving device into the vehicle. It is a further object of the invention to provide a receiving device which also provides said mechanical stability and force transmission characteristics. A further object of the invention is to propose a method of manufacturing said carrying device and a method of manufacturing said receiving device.

It is a basic idea of the invention to provide a carrying device which comprises a carrying plate and edge elements arranged along lateral edge portions of said carrying plate, wherein the edge elements are slanted with respect to the carrying plate. Such a carrying device allows a force transmission of forces acting in a vertical direction as well as in a lateral direction, wherein a large internal accommodation space of the receiving device is provided.

A carrying device, in particular a carrying device for carrying components of a receiving device of a system for inductive power transfer to a vehicle, is proposed.

The carrying device comprises a carrying plate. The carrying plate can have a rectangular shape or contour. In particular, the carrying plate can have two lateral edges, a front edge and a rear edge. The front and the rear edge are defined with respect to a longitudinal axis which can e.g. correspond to a longitudinal axis of the carrying plate.

Said longitudinal axis can be parallel to a longitudinal axis of a vehicle to which the receiving device which comprises the carrying plate is attached. In particular, the longitudinal axis can be oriented parallel to a longitudinal direction, which corresponds to a travelling direction if the vehicle travels straight forward.

The term "lateral" refers to a direction which is oriented perpendicular to the longitudinal direction, wherein the longitudinal axis and the lateral axis are arranged within a horizontal plane. The horizontal plane can e.g. be parallel to a flat ground surface, if the receiving device, which comprises the proposed carrying device, is attached to the vehicle.

A vertical direction is oriented perpendicular to a surface, in particular an upper surface, of the carrying plate. The vertical direction is oriented perpendicular to the aforementioned longitudinal direction and lateral direction. Thus, the longitudinal, lateral, and vertical direction form a right-handed Cartesian coordinate system.

The carrying plate can have a substantially flat upper and flat bottom surface, which are oriented perpendicular to the vertical direction. Substantially means that a large part of said surfaces are arranged within a common plane. The term "substantially flat" includes, however, that the upper and bottom surface can have one or more projection(s) and/or at one recess(es). The carrying plate provides the main support structure that holds the weight of all components connected to the carrying plate. Also, the carrying plate is used to provide and stabilize a desired alignment or position the aforementioned components.

Furthermore, the carrying device comprises a first edge element which is arranged at a first lateral edge of the carrying plate. The first lateral edge extends in the aforementioned longitudinal direction. With respect to said longitudinal direction, the first lateral edge can e.g. be denoted as right lateral edge of the carrying plate.

Furthermore, the carrying device comprises at least another edge element which is arranged at a second lateral edge of the carrying plate. The second lateral edge also extends along the longitudinal direction and is, with respect to the lateral direction, arranged with a predetermined distance from the first lateral edge. With respect to the longitudinal direction, the second lateral edge can also be denoted as left edge of the carrying plate.

Thus, the first and the second lateral edge are arranged at opposite sides of the carrying plate with respect to the lateral direction.

According to the invention, the edge elements are slanted with respect to the carrying plate.

This means that an angle enclosed by an edge element and the carrying plate is larger than 90°, but smaller than 180°. Preferably, the angle lies within an angle interval from 120° to 150°.

In other words, the edge elements are tilted with respect to the carrying plate. The edge elements can also be denoted as sidewing elements or side elements with respect to the carrying plate.

The feature "slanted" or "tilted" means that the edge elements extend away from the carrying plate in a direction which comprises a lateral portion as well as a vertical portion.

The edge elements and the carrying plate enclose an inner volume which is, with respect to the aforementioned vertical direction, located above the carrying plate and in between the edge elements arranged at the first and second lateral edge. In a cross section with a section plane perpendicular to the aforementioned longitudinal direction, the inner volume is enclosed by a substantially trapezoid envelope. The inner volume, however, is open to the top (with respect to the vertical direction).

The feature "slanted" can also mean that at least one flat surface portion of the edge elements encloses the aforementioned angle with the upper surface of the carrying plate.

As the inner volume, the carrying device can have a substantially trapezoidal cross section in the section plane perpendicular to the longitudinal direction.

The carrying plate and the at least two edge elements can be provided by a single piece or joined element. As will be explained later, such a single peace element can be made of plastics.

An edge element can provide or comprise at least one means for attaching the carrying device to a top cover element of a receiving device, wherein the top cover element can be attached to a mounting portion vehicle, in particular at a bottom side of a vehicle. It is, however, also possible that the carrying device is attached directly to said mounting portion. The connecting means of the edge elements can e.g. be arranged at a free end of the edge elements, wherein the free end is opposed to the end which is arranged at the corresponding lateral edge of the carrying plate. A connecting means can e.g. be designed as a hole or bore, in particular a through hole or a trough bore, more particular as a threaded bore. It is, for instance, possible that the edge elements comprise or provide a connecting portion at a free end of the edge element, wherein the surface of the connecting portion is oriented perpendicular to the vertical direction. The connecting means can be arranged at or in said connecting portion.

This means that forces acting on the carrying device, in particular gravity forces of components attached to the carrying device and dynamic or inertial forces, e.g. due to vibrations or accelerations of the carrying device, are transferred to a mounting portion by the slanted edge elements. The slanted or tilted configuration advantageously provides good force transmission or distribution characteristics, in particular for forces acting in or against the vertical direction as well as forces acting in or against the lateral direction. Also, the edge elements provide mechanical strength of the carrying device resulting in a rigid carrying device. Thus, the carrying device ensures a stable positioning of components or elements attached to the carrying device also under operational conditions which, in turn, provides a stable operation of the components of the receiving device. This is desirable as some of the components, in particular components of the electromagnetic system, are very sensible towards changes of position and/or orientation.

Another benefit of the proposed configuration is that an inner volume enclosed by the carrying plate and the edge elements is increased if compared to a carrying device with a substantially rectangular cross section. This advantageously allows arranging more or larger components within said inner volume.

If, as explained later, magnetic, in particular ferromagnetic, elements are arranged on the carrying device, the proposed design advantageously maximizes the magnetic core effective area inside a receiving device comprising said carrying device while providing a fixed predetermined positioning structure with respect to all other magnetic components.

The carrying plate provides a carrying means which maintains a required magnetic distance between components connected to the carrying plate such as windings of a winding structure and all other conduction paths or components which may change the electric or magnetic behavior. At the same time, the carrying device can provide an electrical insulating structure and desired thermal interface between said components.

In a preferred embodiment, at least two edge elements are arranged along a lateral edge of the carrying plate. Consecutive edge elements are spaced along the lateral edge with a predetermined distance. The term "consecutive" relates to the longitudinal direction. This means that edge elements which are consecutively arranged along one lateral edge enclose an open space with a predetermined length along the longitudinal direction.

Also, an edge element can have a predetermined length along the longitudinal direction. It is possible, that multiple edge elements, which arranged at one lateral edge, have different lengths. It is also possible that multiple open spaces along one lateral edge have different lengths.

The open space between the consecutive edge elements along one lateral edge advantageously allows conducting cables of a secondary windings structure from a space under the carrying device to a space above the carrying device, in particular to electric elements arranged within the aforementioned inner volume. Alternatively, cable connectors for electrically connecting the cables providing the secondary winding structure which is arranged under the carrying device can be arranged within said open spaces.

This, in turn, simplifies the mounting and the connection of the secondary winding structure within a receiving device comprising the proposed carrying device.

In another embodiment, the carrying plate and the edge elements are designed as separate pieces. As mentioned before, the carrying plate as well as the separate edge elements can be made of plastics. This advantageously allows building the carrying device while avoiding the purchase and the handling of a large basis element. This also reduces production costs. Also, this allows to independently manufacture said elements, e.g. at a milling site.

To attach and to mechanically fix the edge elements to the lateral edges of the carrying plate, the edge elements can comprise or provide at least one connecting means, wherein the carrying plate, in particular a lateral edge portion of the carrying plate, provides or comprises at least one corresponding connecting means. The connecting means of the edge elements and the carrying plate can engage in order to provide a mechanical connection between the edge elements and the carrying plate.

The connecting means can e.g. be provided by a threaded bore within the carrying plate and a through hole within the edge elements, wherein a bolt or screw can be inserted to the through hole into the threaded bore. The screw or bolt can be, preferably, a non-metallic screw or bolt.

It is, of course, possible, to provide a mechanical connection between the edge elements and the carrying plate by any other connecting means, for example by connecting means providing a snap connection, a latching connection, a form-fit connection or a force-fit connection or any other type of connection.

In a preferred embodiment, however, the edge elements are glued to the carrying plate.

In another embodiment, the edge elements have a connecting portion, wherein the connecting portion is designed to engage with a lateral edge portion of the carrying plate. The connecting portion is arranged at or provided at/by a lower end of an edge element (with respect to the vertical direction). Thus, the connecting portion can be also referred to as bottom-side connecting portion. The connecting portion can be designed such that the edge portion of the carrying plate is positively insertable into the bottom-sided connecting portion. Thus, a form-fit connection can be provided. Said form-fit connection can in particular be designed such that a movement of an edge element in a lateral direction is not possible.

A threaded bore within the carrying plate can e.g. be provided by a female union with a female screw thread which is arranged within a hole, in particular a blind hole, arranged within the carrying plate, in particular within a lateral edge portion of the carrying plate. The female union can be inserted or press-fitted into said hole.

A lateral edge portion of the carrying plate can e.g. be designed as a projection with a vertical section which extends in a vertical direction from the upper surface, and a lateral section which is connected to an upper end of the vertical section and extends in lateral direction away from the carrying plate. Along the lateral direction away from the carrying plate, the lateral section of the projection can reduce in its dimension, e.g. become thinner with respect to a height in the vertical direction.

The connecting portion of an edge element can be designed such that at least two different surface sections of the lateral edge portion with different orientations are encompassed or enclosed by the connecting portion. In particular, the connecting portion can encompass at least a part of a side surface of the aforementioned vertical section of the projection and at least one upper surface section of the aforementioned lateral edge portion of the edge element. Such a design advantageously provides a large contact surface area between an edge element and the corresponding edge portion of the carrying plate. This, in turn, enhances a mechanical stability of the mechanical connection if the edge element is glued to the carrying plate.

In another embodiment, a recess is provided in a laterally outer side or laterally outer side surface of the edge elements. The recess can e.g. be designed as a nut, in particular a rectangular nut. Within said recess, ferrite elements, which will be explained in more detail later, can be arranged in order to cause a distribution or course of the magnetic flux such that the aforementioned inner volume and components arranged within said inner volume are shielded from a magnetic field received and/or generated by the secondary winding structure which can be arranged under the carrying device.

A laterally outer side of the edge element denotes a side which is not oriented towards the inner volume, in particular facing away from the inner volume.

In another preferred embodiment, the carrying plate comprises or provides at least one longitudinal bar. A longitudinal bar denotes e.g. a projection of an upper surface of the carrying plate, in particular with a rectangular cross section in a section plane which is oriented perpendicular to the aforementioned longitudinal direction. The longitudinal bar can extend in a longitudinal direction along the upper surface of the carrying plate, in particular along the total length of the carrying plate.

The longitudinal bar advantageously provides an improved mechanical stability of the carrying device, in particular with respect to torsion of the carrying plate. Additionally, side surfaces of such a longitudinal bar can be used as lay-on surfaces for ferrite elements and/or glued surfaces for a ferrite element. Thus, the arrangement of ferrite elements on the upper surface can be simplified.

In another embodiment, a bottom side of the carrying plate (with respect to the vertical direction) comprises or provides at least one connecting means for connecting at least one cable and/or a cable bearing element of the secondary winding structure to the carrying device.

This advantageously allows to mechanically connect and fix a cable or a cable bearing element to the carrying plate. Hence, the carrying plate, and thus the carrying device, can be used to carry the secondary winding structure.

The at least one connecting means can e.g. be designed as a through hole or as a blind hole. In particular, the hole can be designed as a threaded bore.

Alternatively, the at least one connecting means can be designed as a long hole, in particular a long through hole, for a cable binder which extends through the carrying plate in order to fix cables to the bottom side of the carrying plate.

The cable bearing element can also be referred to as winding housing. Such a winding housing is disclosed in the aforementioned GB 1220050.7.

In another embodiment, at least one pillar element is arranged on an upper side or upper surface of the carrying plate. The pillar element can extend in the vertical direction. The pillar element can especially be used to mechanically align or fasten an element of the receiving device which is arranged in the inner volume. The element can e.g. be another carrying plate for components, e.g. electrical components, such as electrical switches and/or capacitive elements, of the receiving device. The other carrying plate can be designed as a conductor board, in particular a printed circuit board. On such a conductor board, electrical elements of the receiving device, in particular elements of a rectifier and/or capacitive elements providing compensation capacitances, can be arranged.

The other carrying plate can have through holes through which the aforementioned pillars extend if the other carrying plate is arranged in the inner volume.

Thus, a position and orientation of the other carrying plate can be adjusted by said pillar elements.

It is possible that the at least one pillar element and the carrying plate are designed as a single piece or joined element.

In another embodiment, the at least one pillar element comprises or provides at least one connecting means. The connecting means can be used to mechanically connect the pillar element, and thus the carrying plate, to e.g. a top cover of the receiving device or the vehicle (mounting portion).

The connecting means can be arranged at a free end of the pillar element. The connecting means can e.g. be designed as a threaded bore into which a screw or bold can extend.

In particular, the pillar element can be designed as a hollow cylinder with a through hole, wherein a threaded portion is provided at the free end of the through hole.

This advantageously allows mechanically connecting the carrying device via the pillar elements to the aforementioned mounting portion. Thus, the number of force transmission means from the carrying device to the mounting portion is increased which further enhances a mechanical stability.

In another embodiment, the carrying plate and the pillar element are designed as separate pieces.

The pillar element can comprise or provide another connecting means, wherein the carrying plate comprises or provides a corresponding connecting means. The other connecting means of the pillar element and the corresponding connecting means of the carrying plate engage in order to provide a mechanical connection of the pillar element and the carrying plate. The mechanical connection can e.g. be provided by a snap-fit connection, a latching connection or any other type of mechanical connection.

In particular, the mechanical connection is a form-fit connection, wherein the corresponding connecting means of the carrying plate positively fits into a hollow connecting portion of the pillar element.

It is for instance possible that the pillar element has a plate-sided end portion of the pillar element which is staged. This e.g. means that in plate-sided portion of the aforementioned through hole of the pillar element, a radius is larger than the remaining part of the through hole. A cylindrical projection on the upper surface of the carrying plate can be designed such as to fit into said plate-sided end portion. Preferably, the pillar element is glued to the carrying plate.

Additionally, at a free end, the pillar element can have a circular nut. A sealing element, in particular a sealing ring, can be arranged within said circular nut.

In a preferred embodiment, the carrying plate and the edge elements are made of non-magnetic material. A non-magnetic material denotes a material with no or only minimal magnetic conductivity. In particular, the carrying plate and the edge elements can be made of plastic material.

In a further preferred embodiment, the non-magnetic, in particular the plastic, material is fibre-reinforced. An orientation of fibres in the plastic material can be arbitrary. It is, however, possible that an orientation of the fibres is parallel to the aforementioned longitudinal and/or lateral direction.

In another embodiment, the carrying plate and/or the edge elements are made of electrically non-conducting or insulating material. This comprises the case that the carrying plate and/or the edge elements are made of a material with a minimal electrical conductivity.

In another embodiment, the carrying plate and/or the edge elements are made of a thermally conductive material and/or a material with a predetermined thermal capacity. It is, for instance, possible that the material of the carrying plate and/or the edge elements has/have a high thermal conductivity to transmit heat to and from the elements connected to or arranged on or under the carrying plate. Alternatively or in addition, the carrying plate and/or the edge elements can act as an element with a predetermined thermal capacitance. This advantageously allows cooling of the elements connected to the carrying plate.

In another embodiment, the carrying plate and/or the edge elements comprise at least one cooling means. For example, the at least one cooling means can be embedded into the carrying plate and/or the edge elements or attached to the carrying plate and/or the edge elements. The carrying plate and/or the edge elements can have conduits and/or thermally conductive elements, e.g. ceramic elements or pieces, wherein the conduits and/or the thermally conductive elements are thermally coupled to elements connected to the carrying plate. The conduits can be designed as inner conduits of the carrying plate and/or edge elements. A cooling fluid can flow through the conduits. Thus, the conduits and/or thermally conductive elements advantageously provide cooling means for elements connected to the carrying plate.

In particular, the carrying plate and the edge elements can be made of a plastic compound. This allows manufacturing the carrying plate and the edge elements by milling while a high mechanical stability within a predetermined thermal range is provided. This also allows providing a light-weight carrying device, wherein carrying plate and edge elements also provide an electrical insulator with desired thermal characteristics.

This advantageously reduces undesired effects of the carrying device on the operational behaviour, in particular an electric and/or magnetic behaviour, of the receiving device. Also, a deformation resulting from thermal stress is reduced, as heat transmission and/or heat dissipation can be improved.

In another embodiment, the carrying device comprises magnetically conductive elements which are arranged on the upper side or surface and/or a lateral outer side of the edge elements and/or on a bottom side of an edge portion of the carrying plate. A magnetically conductive element in the context of this invention denotes an element, in particular a ferromagnetic element, which is able to guide or transmit the magnetic flux. The term magnetically conductive does not necessarily mean that the element itself produces a magnetic field. In other words, the magnetic element is a magnetically conductive element with a predetermined magnetic conductivity.

The magnetically conductive elements denote elements which are made of magnetisable or magnetically conductive material. Said elements can e.g. be designed as blocks or tiles with a rectangular cross section in a section plane perpendicular to the longitudinal direction. In particular, the magnetically conductive elements can be ferromagnetic elements such as ferrite or iron elements.

The magnetically conductive elements can be mechanically fixed on the carrying device. In particular, the magnetically conductive elements can be glued to the carrying device. In particular, the magnetically conductive elements are used to guide field lines of the magnetic field and shield electric and/or electronic components from the electric field.

Preferably, magnetically conductive elements on the upper side or surface of the carrying plate are arranged in a matrix structure, wherein multiple rows and columns of magnetically conductive elements are provided on the upper side or surface. Preferably, a predetermined amount of the upper surface, in an ideal case a total surface, can be covered by magnetically conductive elements. This allows shielding components arranged within the inner volume and above the magnetically conductive elements from a magnetic field of the secondary winding structure.

In addition or alternatively, magnetically conductive elements can be arranged at a lateral outer side of the edge elements, in particular in the aforementioned recess of the lateral outer side.

In addition or alternatively, the aforementioned lateral edge portion of the carrying plate can provide a support surface for magnetically conductive elements. This support surface can e.g. be a flat surface which is oriented perpendicular to the vertical direction. Also, the support surface can be a bottom-sided surface of the lateral edge portion facing downward.

Further proposed is a receiving device, in particular a receiving device of a system for inductive power transfer to a vehicle. The receiving device can be attached to the vehicle, in particular at a bottom side of the vehicle. The receiving device comprises a carrying device according to one of the previously described embodiments.

Further, the receiving device comprises a top cover element. The top cover element can e.g. be made of a material with a predetermined, in particular high, electrical conductivity. Preferably, the top cover element is made of aluminium or a plastic material with an embedded electrical conductor material. In the case of aluminium, only small losses are generated while good shielding characteristics are provided.

The carrying device is connected or attached to the top cover element. In particular, the carrying device is attached to the top cover element via connecting means arranged at the free ends of the edge elements of the carrying device. Further, the carrying device can also be attached to the top cover element via connecting means arranged at the free end of the aforementioned pillar elements.

Within the proposed receiving device, the inner volume, which is enclosed by the edge elements and the carrying plate, is further enclosed by the top cover element.

The top cover element attached to the vehicle, in particular mechanically fixed to a mounting portion of the vehicle.

As the carrying device is mechanically connected to the top cover element, forces acting on the carrying device will be transferred to the top cover element and/or to a mounting portion to which the top cover element is mounted. This advantageously allows relieving a bottom cover element.

Thus, the proposed receiving device advantageously allows a good force distribution or a force transmission in/of the carrying device to the mounting portion. This, in turn, provides a mechanically stable arrangement of components attached to the carrying device.

In another embodiment, the receiving device further comprises another carrying plate, wherein at least one electric element is arranged on the other carrying plate. The other carrying plate is arranged between the carrying plate and the top cover element, i.e. within the inner volume. In particular, the other carrying plate can be arranged on the upper surface of the carrying plate. As explained before, pillar elements can extend through corresponding through holes in the other carrying plate.

Thus, the proposed carrying device of the receiving devices serves to hold the other carrying plate which can contain electrical elements for an operation of the receiving device.

This further relieves a bottom cover element of the receiving device.

In yet another embodiment, the receiving device further comprises a cable bearing element, wherein the cable bearing element is connected to a bottom side of the carrying plate. In particular, the cable bearing element can be mechanically connected to the bottom side of the carrying plate, e.g. via bolts or screws, in particular non-metallic bolts or screws.

Thus, the carrying device also serves for holding the cable bearing element and cables arranged within the cable bearing element to provide the secondary winding structure of the receiving device.

This further relieves a bottom cover element of the receiving device.

In another embodiment, the receiving device further comprises a bottom cover element, wherein the bottom cover element is attached to the top cover element. The bottom cover element and the top cover element enclose another inner volume, wherein the other inner volume comprises the proposed carrying device, the inner volume enclosed by the carrying device and the edge elements and the top cover element, the cable bearing element, the secondary winding structure and other components of the receiving device. The bottom cover element can also be attached to the carrying plate.

It is for instance possible, that so-called C-profile elements made of magnetically conductive material can be attached to the top cover element, wherein the inner volume enclosed by the top cover element and the bottom cover element also encloses said C-profiles.

In contrast to the US 2008/0129246 A1, the bottom cover element does not carry the weight of the aforementioned components of the receiving device as the components are connected or based on the carrying device. This advantageously allows designing a thin and light-weight bottom cover element while good force transmission and distribution characteristics of the receiving device are provided.

The specific shape allows accommodating all desired components within a receiving device in a desired predetermined position while all electromagnetic functions can be ensured and maintained during operation, also if vibration or inertial effects occur.

Further proposed is a method of manufacturing a carrying device, in particular a carrying device of a receiving device of a system for inductive power transfer to a vehicle. The method comprises the steps of:
  providing a carrying plate according to one of the previously described embodiments,
  arranging a first edge element at a first lateral edge of the carrying plate,
  arranging at least another edge element at a second lateral edge of the carrying plate.

According to the invention, the proposed method further comprises the step of arranging the edge elements slanted with respect to the carrying plate.

It is possible to manufacture the proposed carrying device as a single piece element, in particular by milling the carrying device out of one piece. Another option is to provide the carrying plate and the edge element as separate pieces and attaching or fixing the edge elements to the carrying plate. In particular, the edge elements can be glued and/or screwed to the carrying plate.

This advantageously provides a method to provide a carrying device with the previously described advantages.

Further proposed is a method of manufacturing a receiving device, in particular a receiving device of a system for inductive power transfer to a vehicle. The proposed method comprises the steps of:
  providing a carrying device according to one of the previously described embodiments,
  providing a top cover element,
  attaching the carrying device to the top cover element.

The method can further comprise one or more of the following steps of:
  providing another carrying element with electric or electronic elements and arranging the other carrying plate within a volume enclosed by the top cover element and the carrying plate of the carrying device,
  providing a cable bearing element and a winding structure, wherein the winding structure is embedded within the cable bearing element and attaching the cable bearing element to a bottom side of the carrying plate of the carrying device,
  providing a bottom cover element and attaching said bottom cover element to the top cover element.

It is also possible to provide magnetically conductive elements and attach the magnetically conductive elements to a surface of the carrying plate.

BRIEF DESCRIPTION OF THE DRAWINGS

The invention will be described with reference to the attached figures. The figures show.

DETAILED DESCRIPTION OF THE INVENTION

Figure 1:
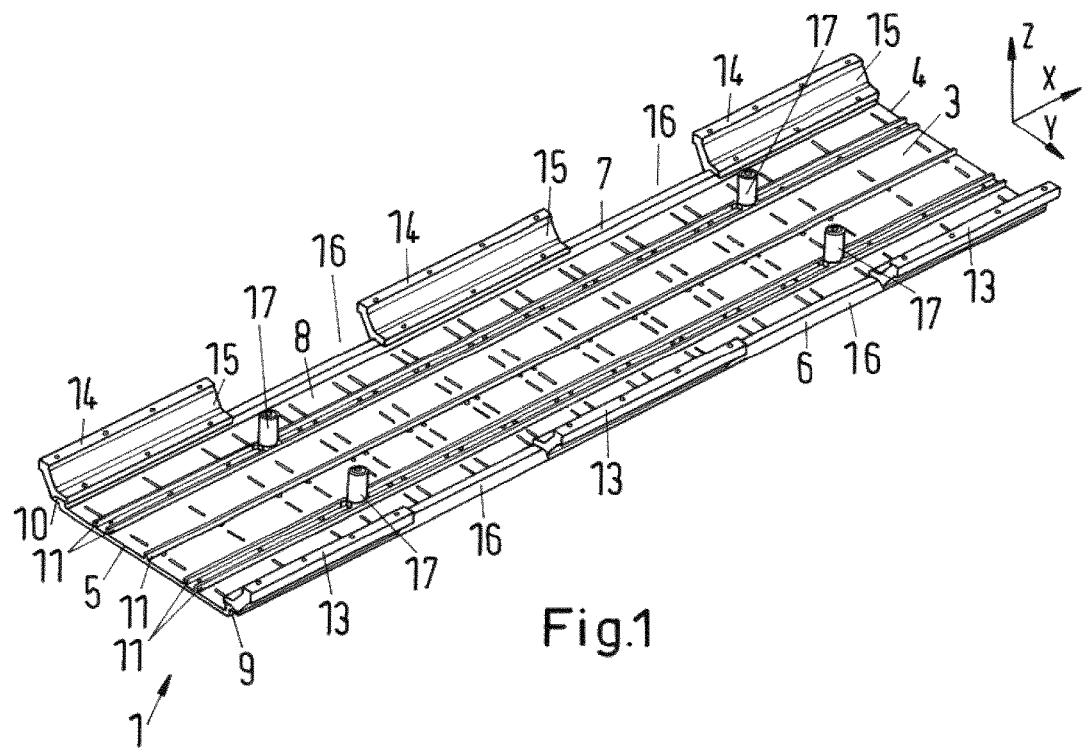
FIG. 1 a perspective view of a carrying device,
  FIG. 2 a top view of the carrying device shown in FIG. 1,
  FIG. 3 a bottom view of the carrying device shown in FIG. 1,
  FIG. 4 a longitudinal section of the carrying device shown in FIG. 1,
  FIG. 5a a perspective view of an edge element,
  FIG. 5b a cross section of the edge element shown in FIG. 5a
  FIG. 5c another perspective view of the edge element shown in FIG. 5a,
  FIG. 6 a perspective view on a carrying plate,
  FIG. 7 a lateral cross section through the carrying device shown in FIG. 1,
  FIG. 8 a detailed view of a carrying plate and an edge element,
  FIG. 9a a perspective view of a pillar element,
  FIG. 9b another perspective view of the pillar element shown in FIG. 9a
  FIG. 10 a detailed view of the carrying plate and a pillar element, and
  FIG. 11 an explosion view of a receiving device.

FIG. 1 shows a perspective view of a carrying device 1 according to the invention. The carrying device 1 is a carrying device 1 of a receiving device 2 (see FIG. 11) of a system for inductive power transfer to a vehicle (not shown), in particular a rail vehicle or an automobile.

The carrying device 1 comprises a carrying plate 3. The carrying plate 3 has a substantially rectangular shape.

A longitudinal direction x is indicated by an arrow and is oriented parallel to a longitudinal axis of symmetry of the carrying plate 3. A lateral direction y is oriented perpendicular to the longitudinal direction x and is oriented parallel to a lateral axis of symmetry of the carrying plate 3. A vertical direction z is oriented perpendicular to the longitudinal direction x and the lateral direction y. All directions x, y, z form a right-handed Cartesian coordinate system. Corresponding longitudinal, lateral and vertical axes are indicated by arrows.

Figure 8:
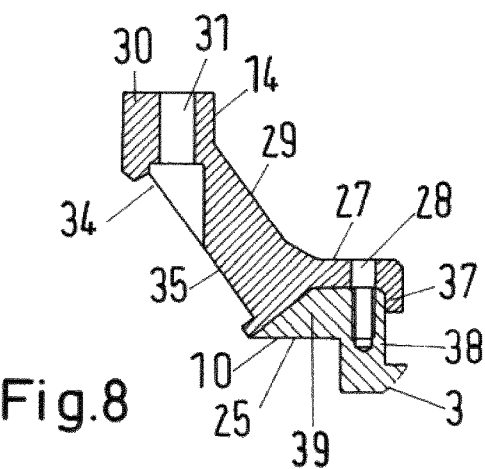

The carrying plate 3 has, with respect to the longitudinal direction x, a front edge 4 and a rear edge 5. Also, the carrying plate has a first lateral edge 6 and a second lateral edge 7. The lateral edges 6, 7 extend parallel to the longitudinal direction x. A major part of an upper surface 8 of the carrying plate 3 is arranged in a horizontal plane, wherein the vertical direction z is oriented perpendicular to said horizontal plane. Lateral edge portions 9, 10 of the carrying plate 3, which will be described with reference to FIG. 8, are not fully arranged within said horizontal plane.

The carrying plate 3 shown in FIG. 1 comprises five longitudinal bars 11 which extend parallel to the longitudinal direction x along the total length of the carrying plate 3. The longitudinal bars 11 are designed as projections of the upper surface 8 of the carrying plate 3. With respect to a vertical direction z the longitudinal bars 5 can have a predetermined height. The longitudinal bars 11 are used to align ferrite elements 12 (see FIG. 11). Also, the longitudinal bars 11 provide gaps with a predetermined size for arranging ferrite elements 12 (see FIG. 11) and provide a higher structural strength in the longitudinal direction x.

The carrying device 1 further comprises three edge elements 13 which are arranged at the first lateral edge 6 of the carrying plate 3. Furthermore, the carrying device 1 comprises three edge elements 14 which are arranged at the second lateral edge 7 of the carrying plate 3.

The edge elements 13, 14 are slanted with respect to the carrying plate 3. This means that a direction of extension of the edge elements 13, 14 away from the carrying plate 3 comprises a lateral portion as well as a vertical portion. In particular, the edge elements 13, 14 comprise a flat surface portion 15 which encloses an angle of an angle interval ranging from 120° to 150° with the horizontal plane comprising the aforementioned substantial part of the upper surface 8 of the carrying plate 3.

Also shown is that consecutive edge elements 13, 14 are spaced with a predetermined distance along the corresponding lateral edge 6, 7. Thus, free spaces 16 are provided between consecutive edge elements 13, 14 along the lateral edges 6, 7 of the carrying plate 3. The free spaces 16 provide space for arranging sections of cables by which a winding structure (not shown) is connected to electrical elements arranged above the carrying plate 3.

Also shown is that four pillar elements 17 are arranged on the upper surface 8 of the carrying plate 3. A longitudinal axis (not shown) of symmetry of said pillar elements 17 extends parallel to the vertical direction z. The pillar elements 17 are provided by hollow tubular cylinders, which will be explained in more detail with reference to FIGS. 9a and 9b.

Figure 2:
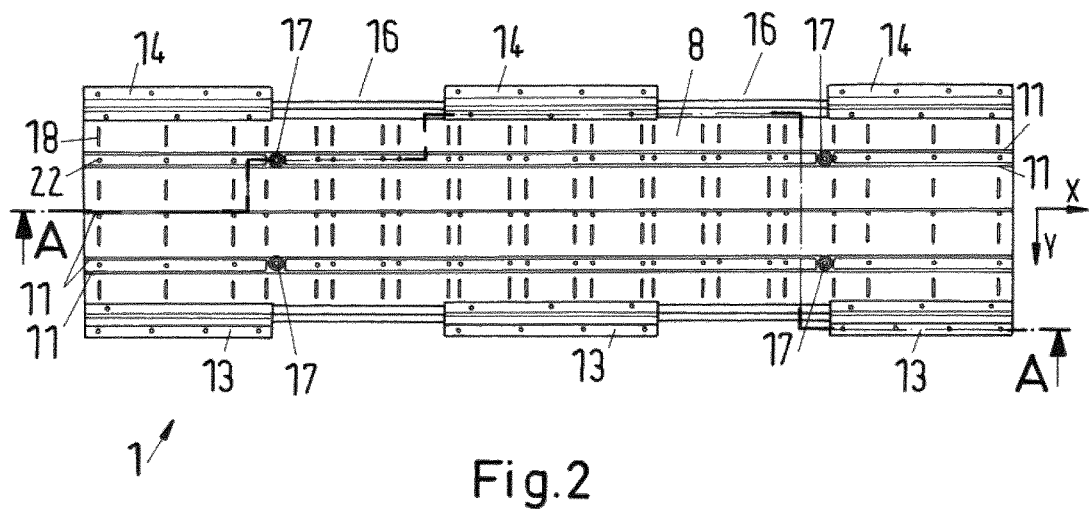

FIG. 2 shows a top view of the carrying device 1 shown in FIG. 1. It is shown that the carrying plate 3 comprises long holes 18 which extend from the upper surface 8 to a bottom surface 19 (see FIG. 3). These long holes 18 can be used to arrange, preferably non-magnetic and non-metallic, mechanical fixation means, e.g. cable binders, for attaching a cable bearing element 50 (see e.g. FIG. 11) or cables of a winding structure (not shown) to the carrying device 1. For illustration purposes, only one long hole 18 is denoted by a reference sign.

Also shown is that through holes 22 are arranged in the carrying plate 3 which extend from the upper surface 8 to the bottom surface 19. These through holes 22 can e.g. be designed as threaded holes. These through holes can also be used to attach elements to the carrying plate 3. For illustration purposes, only one through 22 is denoted by a reference sign.

Figure 3:
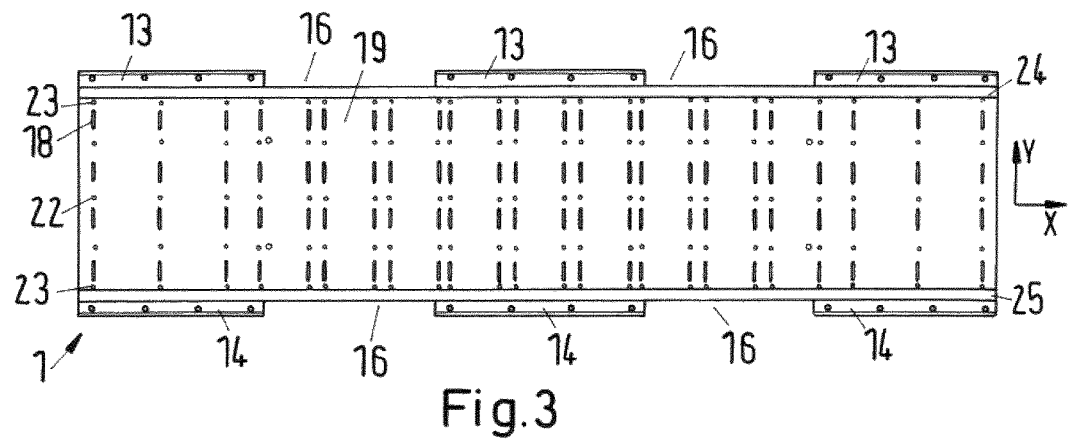

FIG. 3 shows a bottom view of the carrying device 1 shown in FIG. 1. Shown are the previously described long holes 18 and through holes 22. Furthermore, blind holes 23 are arranged in the carrying plate, in particular at a bottom side of the carrying plate 3. For illustration purposes, only two blind holes 23 are denoted by a reference sign.

Also shown is a bottom side surface 24 of the first lateral edge portion 9 (see FIG. 1) and a bottom side surface 25 of second lateral edge portion 10 (see FIG. 1) of the carrying plate 3. The bottom side surfaces 24, 25 are flat surfaces with a predetermined width in the lateral direction y. Ferrite elements 12 (see FIG. 11) can be arranged on these flat surfaces 24, 25 and fixed to said surfaces 24, 25.

Figure 4:
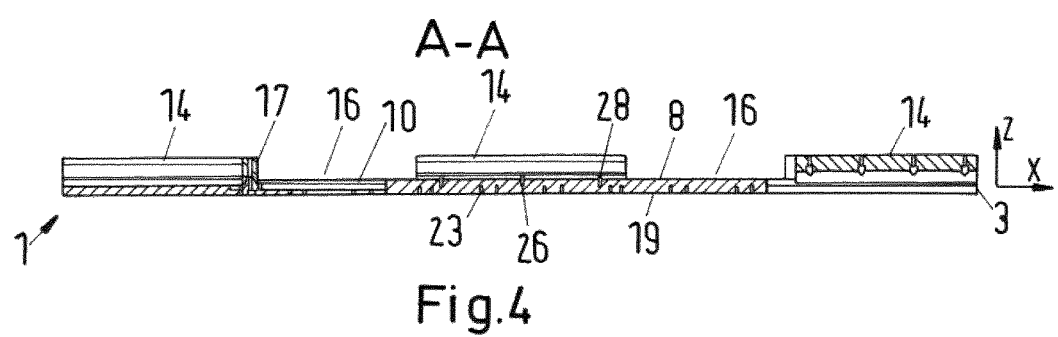

FIG. 4 shows a longitudinal cross section along the intersection line A-A of the carrying device 1 shown in FIG. 2. Shown are blind holes 23 which extend from a bottom surface 19 of the carrying plate 3 into the body of the carrying plate 3. Further shown are blind holes 26, which extend from an upper surface of the second lateral edge portion 10 into the body of the carrying plate 3. These blind holes 26 are arranged in a region where an edge element 14 is attached to the carrying plate 3. A bottom-sided connecting portion 27 (see e.g. FIG. 5a) comprises through holes 28. The blind holes 26 can be designed as threaded holes. Thus, if through holes 28 of the edge element 14 are aligned with blind holes 26, edge elements 14 can be mechanically fixed to the carrying plate 3 by e.g. a screw (not shown). If the edge elements 14 are glued to the carrying plate 3, fixation by screws can be performed to properly align the edge elements 13, 14 along the lateral edges 6, 7 of the carrying plate 3. After an adhesive is hardened and edge elements 13, 14 are safely attached to the carrying plate 3, screws can be removed.

Figures 5A, 5B, 5C:
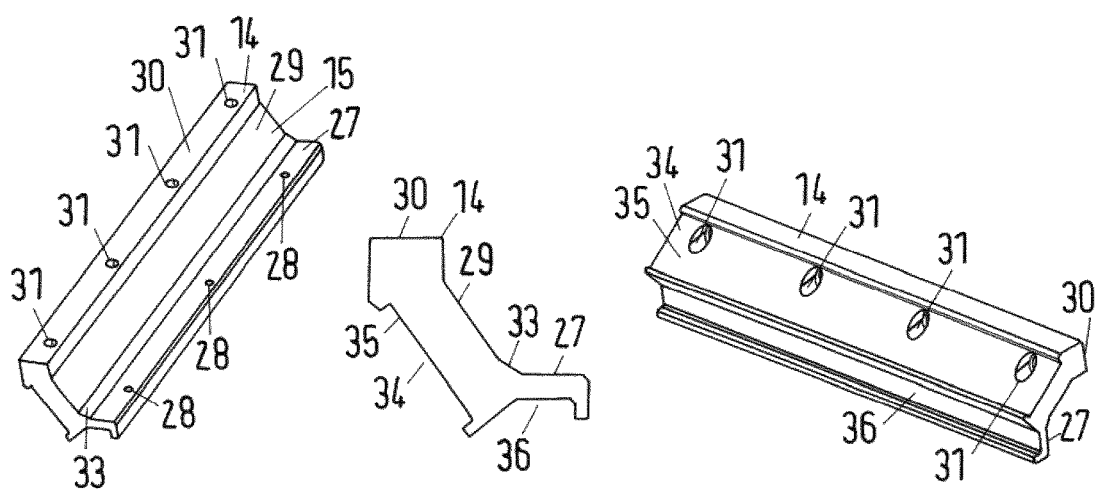

FIG. 5a shows a perspective view of an edge element 14. The edge element 14 comprises a bottom-sided connecting portion 27, a wall portion 29 and a top-sided connecting portion 30. The wall portion 29 provides the flat surface region 15 (see FIG. 1). The bottom-sided connecting portion 27 comprises the previously described through holes 28 for attaching the edge element 14 to an edge portion 10 of the carrying plate 3.

The top-sided connecting portion 30 provides a flat upper surface which is oriented perpendicular to the vertical direction z if the edge element 14 is attached to the carrying plate 3. Furthermore, the top-sided connecting portion 30 comprises through holes 31. By means of these through holes 31, the edge element 14 can be attached to a top cover element 32 (see FIG. 11).

Also shown is a transition portion 33 which is arranged in between the wall portion 29 and the bottom-sided connecting portion 27. A surface of the transition portion 33 encloses an angle with the horizontal plane comprising a substantial part of the upper surface 8 which is larger than the angle between the wall portion 29 and said horizontal plane.

The bottom-sided connecting portion 27 also provides a flat surface which is oriented perpendicular to the vertical direction z.

In FIG. 5b, a cross section of the edge element 14 shown in FIG. 5a is shown. It can be seen that a bottom-sided connecting portion 27 has a substantially U-shaped cross section, wherein a slanted flank of the U-shaped cross section does not extend perpendicular to a base section of the U-shaped cross section but encloses an angle larger than 90° with said base section. A length of said slanted flank between the base section and the free end of said slanted flank is longer than a length of another perpendicular flank 37 (see FIG. 8) of the U-shaped cross section which is arranged at an opposite end of the base section. The base section is oriented perpendicular to the vertical direction z.

Thus, the bottom-sided connecting portion 27 provides a claw fastener. The shown claw fastener engages with the lateral edge portion 10 of the carrying plate 3. Using the shown design of the bottom-sided connecting portion 27, a contact surface between the edge element 14 and the lateral edge portion 10 of the carrying plate 3 is increased. Thus, a gluing surface is increased which, in turn, leads to a more robust mechanical connection of the edge element 14 to the carrying plate 3. Also shown is an inner volume 36 enclosed by the claw-like bottom-sided connecting portion 27.

Also shown is a recess 34 which is provided in laterally outer surface 35 of the edge element 14. The recess 34 is provided by a nut. Within that recess 34, ferrite elements 12 (see FIG. 11) can be arranged and glued to the edge element 14. The laterally outer surface of the edge element 14 denotes a surface 35 which faces to a direction opposite of the direction faced by the wall portion 29. Thus, laterally outer surface is arranged opposite to the wall portion 29 with respect to the edge element 14.

In FIG. 5c another perspective view of the edge element 14 is shown. In particular shown are the through holes 31, which extend from the laterally outer surface 35 of the edge element 14 to the top surface provided by the top-sided connecting portion 30. Also shown is the inner volume 36 enclosed by the bottom-sided connecting portion 27. If the edge element 14 is attached to the carrying plate 3, the lateral edge portion 10 of the carrying plate 3 extends at least partially into that inner volume 36. Thus, a form-fit connection is provided.

Figure 6:
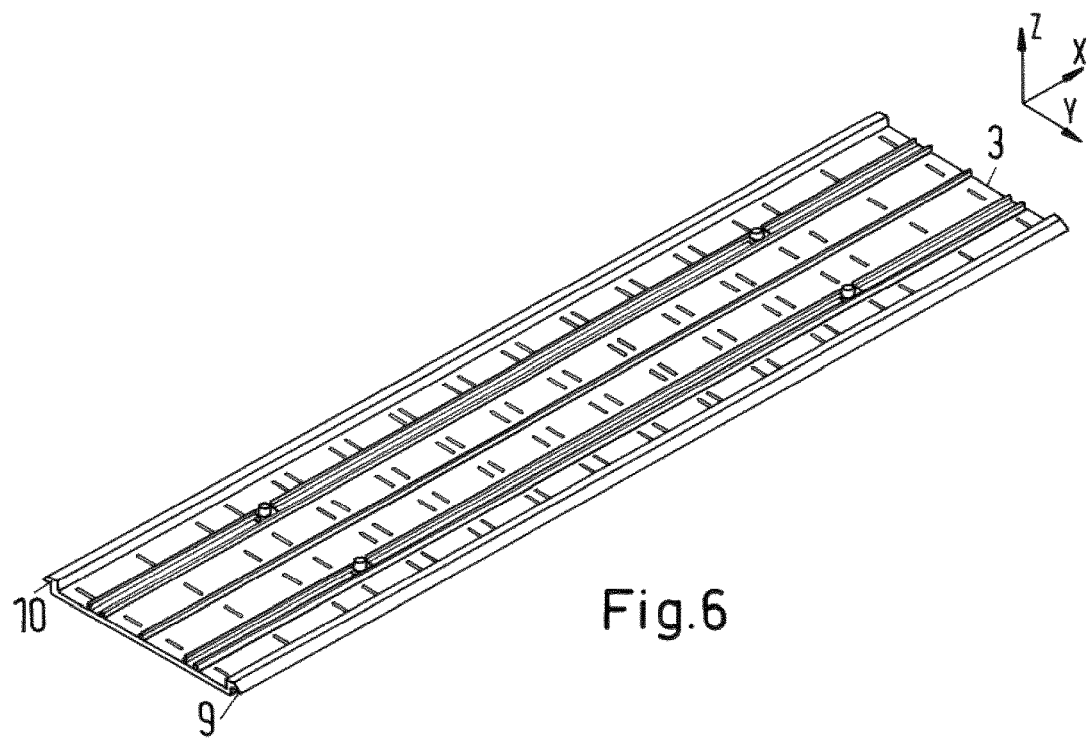

In FIG. 6, a carrying plate 3 without any edge elements 13, 14 is shown. In particular shown are edge portions 9, 10 of the carrying plate 3. These edge portions 9, 10 are designed to form-fit into the inner volume 36 (see FIG. 5b) of the edge elements. The edge portions 9, 10 have a flat upper surface which is oriented perpendicular to the vertical direction z. If the edge elements 13, 14 are arranged on the edge portions 9, 10, said upper surface abuts on the aforementioned base section of the bottom-sided connecting portion 27. Also, the edge portions 9, 10 comprise a tapered portion which tapers towards a free lateral end of the edge portion 9, 10. The tapered portions have a flat upper surface which encloses an angle larger than 90° with the flat upper surface which is oriented perpendicular to the vertical direction z. If the edge elements 13, 14 are arranged on the edge portions 9, 10, said surface abuts on the aforementioned slanted flank of the bottom-sided connecting portion 27.

The edge portions 9, 10 comprises a vertical part 38 (see FIG. 8) extending in the vertical direction z from the upper surface 8 and a lateral part 39 extending in or against a lateral direction y away from the carrying plate 3, wherein the tapered portion is a portion of said lateral part 39.

The shown design of the lateral edge portions 9, 10 allows to claw-fasten the edge elements 13, 14, in particular the bottom-sided connecting portion 27 of the edge elements 13, 14 to the lateral edge portions 9, 10 of the carrying plate 3.

Figure 7:
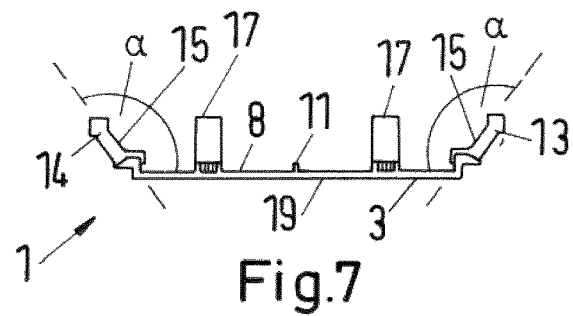

FIG. 7 shows a lateral cross section of the carrying plate 3. Shown is a predetermined angle α between the upper surface 8 of the carrying plate 3 and the flat surface portion 15 of the wall portion 29 of the edge elements 13, 14, wherein the angle α is larger than 90° but smaller than 180°.

In FIG. 8 a detailed view of an edge element 14 and a lateral edge portion 10 of the carrying plate 3 are shown. It can be seen that a perpendicular flank 37 of the U-shaped cross section of the bottom-sided connecting portion 27 of the edge element 14 engages behind a vertical part 38 of the lateral edge portion 10. The lateral edge portion 10 further comprises a lateral part 39 which is designed in order to form-fit into the claw-like design of the bottom-sided connecting portion 27. Furthermore, said lateral edge portion 10 provides a flat surface at a bottom side 25 of the lateral edge portion 10 for arranging ferrite elements 12 (see FIG. 11).

Figure 9A:
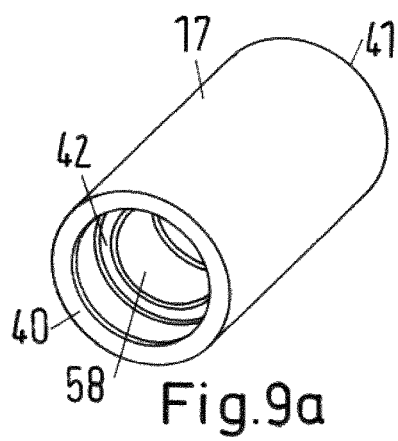

FIG. 9a shows a perspective view of a pillar element 17. It is shown that the pillar element 17 is designed as a hollow tubular cylinder with a through hole 58. A diameter of said through hole 58 is stepped. This means, that at a first end 40 of the pillar element 17, the diameter is larger than at a second end 41 of the pillar element 17. Thus, a circular ring-shaped surface 42 is provided which can be used to glue the pillar element 17 to a base element 43 (see FIG. 10) of the carrying plate 3.

Figure 9B:
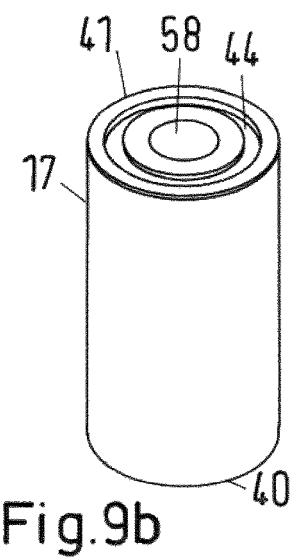

FIG. 9b shows another perspective view of the pillar element 17. At a second end 41 of the pillar element 17, in particular at a second front side of the pillar element 17, a circular nut 44 is provided for arranging sealing means.

Figure 10:
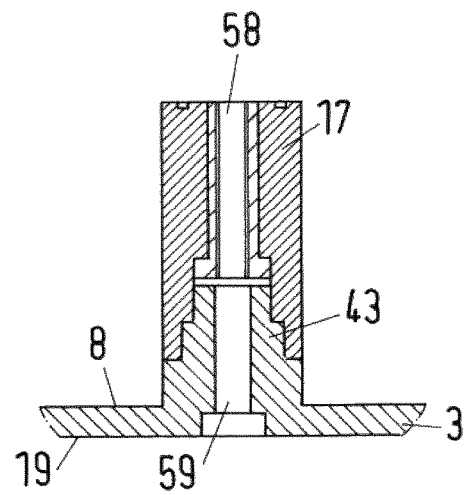

In FIG. 10, a lateral cross section through a pillar element 17 attached to the carrying plate 3 is shown. The carrying plate 3 provides a base element 43 which is designed as a projection with respect to the upper surface 8 of the carrying plate 3. Base element 43 is designed as a staged hollow cylinder providing a through hole 59. At a bottom side 19 of the carrying plate 3, a diameter of the through hole 59 is increased in order to provide space for a screw head of a screw which can be used to mechanically fix the pillar element 17 to the carrying plate 3. The through hole 58 of the pillar element 17 is designed as a threaded hole. The threaded hole can be provided by a threaded socket, e.g. a threaded female union which is inserted into the through hole 58.

Also, the through hole 58 of the pillar element 17 is a staged through hole 58 which is designed to form-fit on staged base element 43 of the carrying plate 3. The staged design advantageously increases a gluing surface for attaching the pillar element 17 to the carrying plate 3. Furthermore, the screw, in particular a screw made of a non-conducting material, can be inserted into the through hole 44 of the base element 43 and extend into the threaded hole provided by the through hole 58 of the pillar element 17. The through hole 58 can simultaneously be used to connect the pillar element 17 to a top cover element 32 (see FIG. 11).

Figure 11:
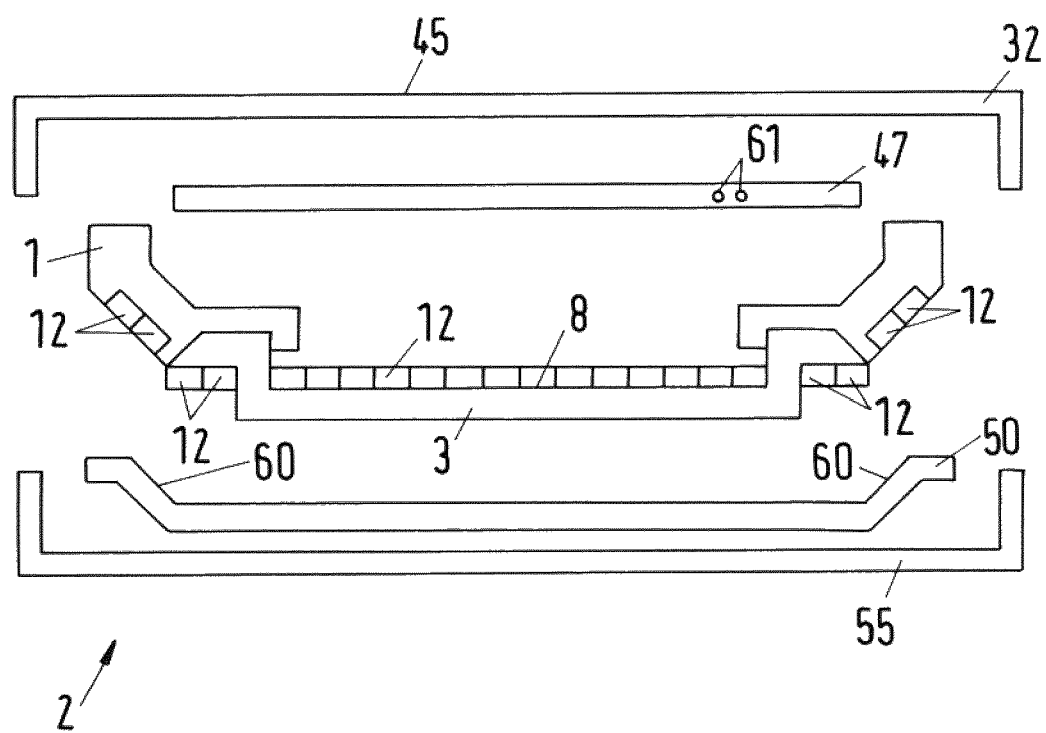

FIG. 11 shows an explosion view of a receiving device 2 comprising the proposed carrying device 1. The receiving device 2 comprises a top cover element 32 which can be attached to a mounting portion (not shown) of the vehicle (not shown). The top cover element 32 is designed as a tray with a U-shaped cross section opened towards a bottom side of the top cover element 32 (with respect to the vertical direction z). The carrying device 1 is attached to the top cover element 32, in particular to a base plate 45 of the top cover element 32. Threaded holes (not shown) can be arranged within said base plate 45. A screw can extend through the through holes 31 of the edge elements 13, 14 and engage with the threaded holes of the top cover element 32.

Further shown is another carrying plate 47 on which electric and/or electronic elements (not shown) are arranged. The electric and/or electronic elements can e.g. be elements of a rectifier of the receiving device.

The other carrying plate 47 has through holes through which pillar elements 17 (see e.g. FIG. 10) of the carrying device 1 can extend. This advantageously allows aligning the other carrying plate 47 and the corresponding electric and/or electronic elements within an inner volume enclosed by the top cover element 32 and the carrying device 1. Also shown are connecting means 61 for a cooling system of the other carrying plate 47.

Further shown are ferrite elements 12 which are designed as ferrite bars or tiles. For illustration purposes, only some of the ferrite elements 12 are denoted by a reference sign. These ferrite elements 12 are arranged on the upper surface 8 of the carrying plate 1, within the recess 34 of the edge elements 13, 14 (see e.g. FIG. 5a) and on bottom surfaces 24, 25 of the lateral edge portions 9, 10 of the carrying plate 3. In particular, the ferrite elements 12 can be glued to said elements of the carrying device 1.

Further provided is a winding structure (not shown) which provides a winding structure of a secondary side of a transformer for inductive power transfer. Also shown is a cable bearing element 50 for guiding cables or electric lines of the winding structure. Said cable bearing element 50 is adapted to position and/or to hold at least one line section of an electric line, wherein the electric line provides a part of the winding structure. The cable bearing element 50 can provide at least one guiding channel for the section of the electric line. A base of a first section of the guiding channel is arranged within a first horizontal plane and a base of another section of the guiding channel is arranged within a second horizontal plane, wherein the second plane is parallel to the first plane and spaced apart from the first plane with a first predetermined distance in the vertical direction. The first section can e.g. be a lateral section and the other section can e.g. be a longitudinal section. Thus, the first section of the guiding channel extends perpendicular to the other section of the guiding channel.

In particular, the first section and the other section are connected via a connecting section 60, wherein the connecting section 60 comprises ramp-shaped section. If the cable bearing element 50 is connected to the carrying device 1, at least one part of the connecting section 60 can extend parallel to the edge elements 13, 14, in particular parallel to the wall portion 29 providing the slanted surface portion 15. Thus, said part of the connecting section 60 can abut on the lateral outer surface 35 of the edge element 13, 14 or a ferrite element 12 arranged within the recess 34 of the corresponding edge element 13, 14. This allows a very compact design of the receiving device 2 comprising the cable bearing element 50.

Not shown are cable lugs of the winding structure, which extend in the vertical direction z. If the cable bearing element 50 is connected to a bottom surface 19 of the carrying device 1, the cable lugs 51 will extend through the free spaces 16 (see e.g. FIG. 1) which advantageously allows to electrically connect the cables or electric lines of the winding structure to the electric or electronic elements arranged on the other carrying plate 47.

The cable bearing element 50 can comprise connecting portions with holes. By these holes, the cable bearing element 50 can be attached to the carrying plate 3, in particular by screws.

Not shown are shielding elements of the receiving device 2. These shielding elements can have a so-called C-profile. The shielding elements can be mechanically attached to the top cover element 32, wherein the winding structure is arranged at least partially within an inner volume enclosed by the C-profile shielding elements. The shielding elements have a C-shaped cross section within a section plane oriented perpendicular to the longitudinal direction x. Both opposing shielding elements are opened towards one another and towards the cable bearing element 50.

Also shown is a base cover element 55 which can be also attached to the top cover element 32. The base cover element 55 is also designed as a tray, wherein the aforementioned elements are arranged within an inner volume enclosed by the base cover element 55 and the top cover element 32, if said elements 32, 55 are attached to one another.

The invention claimed is:

1. A carrying device of a receiving device of a system for inductive power transfer to a vehicle, comprising:
   a carrying plate,
   a first edge element arranged at a first lateral edge of the carrying plate,
   at least another edge element arranged at a second lateral edge of the carrying plate,
   at least one magnetically conductive element arranged on an upper side of the carrying plate and/or a lateral outer side of each of the edge elements,
   wherein
   the edge elements are slanted with respect to the carrying plate.

2. The carrying device according to claim 1, wherein at least two edge elements are arranged along a lateral edge of the carrying plate, and wherein consecutive edge elements along the lateral edge are spaced with a predetermined distance.

3. The carrying device according to claim 1, wherein the carrying plate and the edge elements are separate pieces.

4. The carrying device according to claim 3, wherein the edge elements have a connecting portion, and wherein the connecting portion engages with a lateral edge portion of the carrying plate.

5. The carrying device according to claim 1, wherein a recess is provided in a laterally outer side of the edge elements.

6. The carrying device according to claim 1, wherein the carrying plate comprises at least one longitudinal bar.

7. The carrying device according to claim 1, wherein a bottom side of the carrying plate comprises or provides at least one connecting means for connecting at least one cable and/or a cable bearing element to the carrying device.

8. The carrying device according to claim 1, wherein at least one pillar element is arranged on the upper side of the carrying plate.

9. The carrying device according to claim 8, wherein the at least one pillar element comprises at least one connecting means.

10. The carrying device according to claim 8, wherein the carrying plate and the pillar element are separate pieces.

11. The carrying device according to claim 1, wherein the non-magnetic material is fibre-reinforced.

12. The carrying device according to claim 1, wherein the carrying plate and/or the edge elements are made of at least one of an electrically non-conducting or insulating material, a thermally conductive material, or a material with a predetermined thermal capacity.

13. The carrying device according to claim 1, wherein the carrying plate and/or the edge elements are made of a non-magnetic material.

14. The carrying device according to claim 1, wherein the carrying plate and/or the edge elements comprise at least one cooling means.

15. The carrying device according to claim 1, wherein the carrying device comprises magnetically conductive elements which are arranged on a bottom side of an edge portion of the carrying plate.

16. A receiving device of a system for inductive power transfer to a vehicle, comprising:
   a carrying device according to claim 1,
   a top cover element,
   wherein the carrying device is attached to the top cover element.

17. The receiving device according to claim 16, wherein the receiving device further comprises another carrying plate, wherein at least one electric and/or electronic element is arranged on the other carrying plate, and wherein the other carrying plate is arranged between the carrying plate and the top cover element.

18. The receiving device according to claim 17, wherein the receiving device further comprises a cable bearing element, and wherein the cable bearing element is attached to a bottom side of the carrying plate.

19. The receiving device according to claim 17, wherein the receiving device further comprises a bottom cover element, and wherein the bottom cover element is attached to the top cover element.

20. A method of manufacturing a carrying device of a receiving device of a system for inductive power transfer to a vehicle, comprising the steps of:
   providing a carrying plate made of a non-magnetic material,
   arranging a first edge element made of a non-magnetic material at a first lateral edge of the carrying plate,
   arranging at least another edge element made of a non-magnetic material at a second lateral edge of the carrying plate, wherein
   the edge elements are arranged slanted with respect to the carrying plate.

21. A method of manufacturing a receiving device of a system for inductive power transfer to a vehicle, comprising the steps of:
   providing a carrying device according to claim 1,
   providing a top cover element,
   attaching the carrying device to the top cover element.

* * * * *